CAMERA LOCKING DEVICE

Original Filed Jan. 22, 1962 2 Sheets-Sheet 1

Douglass C. Harvey
Hubert Nerwin
INVENTORS
BY R. Frank Smith
ATTORNEYS

CAMERA LOCKING DEVICE

Original Filed Jan. 22, 1962 2 Sheets-Sheet 2

Douglass C. Harvey
Hubert Nerwin
INVENTORS
BY R. Frank Smith
Earl T. Thoramorg
ATTORNEYS United States Patent Office Re. 26,181
Reissued Apr. 4, 1967

26,181
CAMERA LOCKING DEVICE

Douglass C. Harvey and Hubert Nerwin, Rochester, N.Y., assignors to Eastman Kodak Company, Rochester, N.Y., a corporation of New Jersey Original No. 3,096,699, dated July 9, 1963, Ser. No. 167,791, Jan. 22, 1962. Application for reissue July 7, 1965, Ser. No. 470,305
7 Claims. (Cl. 95—31)

Matter enclosed in heavy brackets [ ] appears in the original patent but forms no part of this reissue specification; matter printed in italics indicates the additions made by reissue.

The present invention relates to locking devices for the covers of photographic cameras and more specifically to such devices *for use in cameras using removable light sealed roll film magazines containing a film take-up spool,* whereby a member of the film winding mechanism of a camera is moved out of engagement with the film take-up spool by releasing the cover locking means and is engaged with the spool by locking the cover.

In most roll film cameras in which the film is wound onto a take-up spool which is then removed from the camera, including cameras in which the spool is housed in a removable magazine, the take-up spool is rotated by a driving member of the film winding mechanism which is axially received by a cooperating structure on one end of the spool. If the construction of the camera requires that the [spool] *film magazine* be installed in a radial direction, the driving member must necessarily be axially movable to a retracted position and to a spool engaging position to enable the camera to be loaded and unloaded. This movement of the driving member is generally accomplished by manually retracting or depressing the film winding knob of the camera.

In order to eliminate the extra operations involved in manually moving the driving member *and to permit rapid loading and unloading of a film magazine,* a primary object of the present invention is to automatically retract the driving member as the camera locking device is released *to enable the film magazine to be quickly loaded or unloaded,* and to return the driving member to its spool engaging position *directly engaging the film spool of a roll film magazine* as the camera is locked.

One proposed approach to combining the operation of the locking means with the movement of the driving member involves locking the camera case by means of the winding mechanism itself. Thus, when the winding key or knob is retracted, the camera cover is released. This approach, however, is not entirely satisfactory because of the possibility of accidentally releasing the cover while winding the film and because of the difficulty involved in securely locking the cover in this manner without impairing the operation of the winding device.

Another object of the invention, therefore, is to combine the camera locking means with the spool engaging member in such a way that the spool engaging member is retracted by releasing the locking means but is independent of the locking means when the camera is closed and locked.

Yet another object of the invention is to provide a camera with such means which automatically lock the camera cover when it is closed without requiring a separate, manual locking operation.

These and other important objects of the invention will be readily apparent from the following description, reference being made to the accompanying drawings in which.

Figure 2:
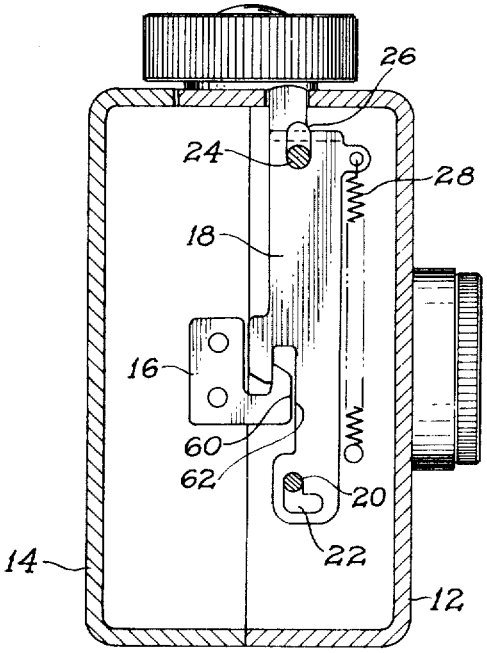
FIG. 2 is a cross sectional end view of the camera taken substantially along the line 2—2 of FIG. 1 showing the cover locking mechanism in locked position.

Referring now to FIGS. 1–6, a camera according to the present invention may comprise a front housing 12 and a movable cover 14, which is held in closed position by the cooperation of a fixed locking member 16 on the cover and a movable locking member 18 slidably mounted on the end wall of housing 12 by means of a rivet or post 20 extending through an L-shaped slot 22 in the lower end of the movable locking member and by a release element 24, the shank of which is secured to the member and extends through a straight slot 26 in the housing end wall. A tension spring 28, attached at one end to member 18 and at the other end to the end wall of housing 12, urges member 18 into locking engagement with member 16. In this embodiment of the invention, the film take-up spool 30, adapted for use in the camera, is incorporated in a *light sealed* film magazine 32 which may be of the type disclosed in pending U.S. patent application Serial No. 163,843, filed January 2, 1962, *now abandoned.* [It should be understood, of course, that the invention is not limited to cameras employing film magazines, but is equally applicable to cameras of the more conventional type adapted to be loaded with roll film.]

The illustrated film winding mechanism comprises a shaft 34 slidably and rotatably supported in axial alignment with spool 30 by a bushing 36 and provided with an external winding knob 38 fixed thereto by means of a screw 40. A spool driving member 42 is attached to the inner end of shaft 34 and comprises a disk 44 provided with one or more spool engaging keys 46. A compression spring 48 between bushing 36 and disk 44 urges the spool driving member toward *and into direct engagement with* the film spool while allowing it to be rotated by knob 38. Another coil spring 50 is tightly wound about shaft 34 with one end 52 of the spring located in a slot 54 in bushing 36. This spring serves as a one-way clutch to allow shaft 34 to rotate only in the film winding direction but allows the shaft to move axially by virtue of the freedom of the end 52 of spring 50 in slot 54.

Figure 1:
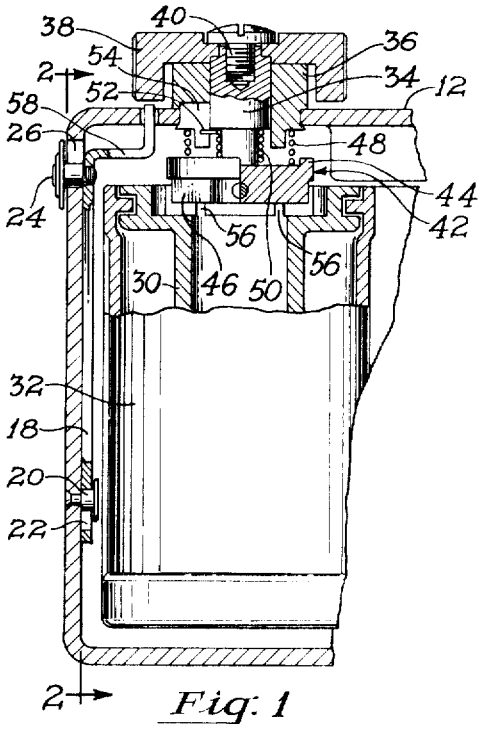
FIG. 1 is in a partial cross sectional front view of a portion of a camera according to a preferred embodiment of the invention showing the cover locking mechanism in locked position and the spool driving member in driving engagement with the film take-up spool of a *removable* film magazine.
Figure 4:
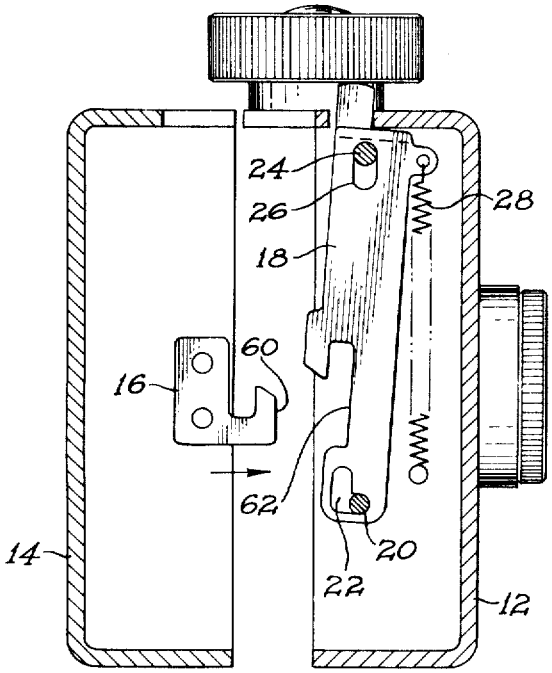
FIG. 4 is a cross sectional view of the camera taken substantially along the line 4—4 of FIG. 3 showing the cover locking mechanism in released position and the cover partially opened.
Figure 3:
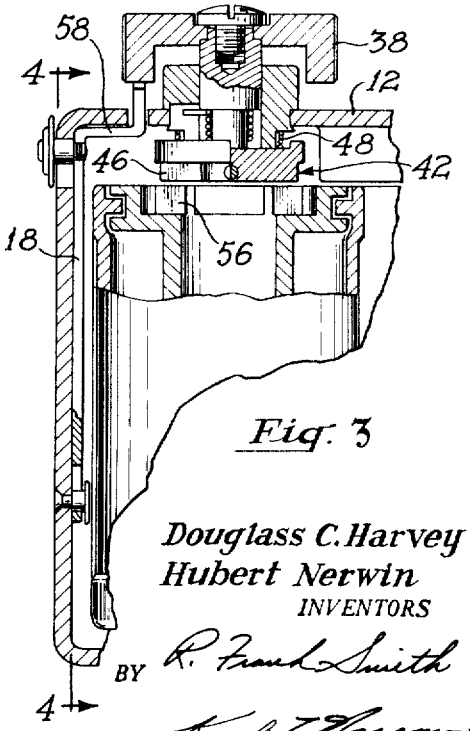
FIG. 3 is a view of the camera corresponding to FIG. 1 showing the cover locking mechanism in released position and the spool driving member out of engagement with the film take-up spool.
Figure 5:
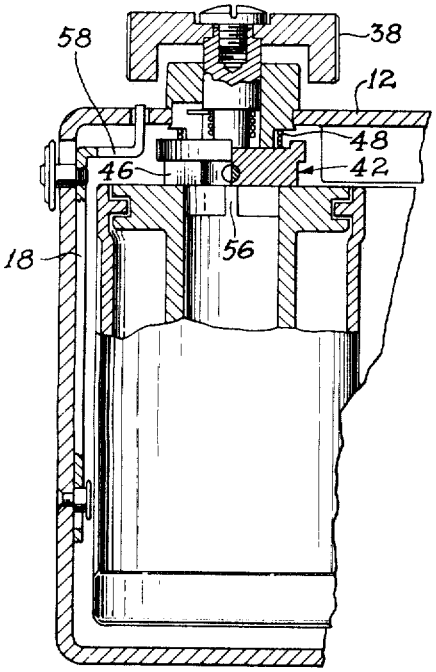
FIG. 5 is a view of the camera corresponding to FIG. 1, showing the cover locking mechanism in locked position and illustrating the position of the spool driving member when the take-up spool happens to be so oriented as to prevent the immediate driving engagement of the driving member with the spool.

As shown in FIG. 1, when the camera is in closed operational condition, a driving relation is established between the winding mechanism and the film take-up spool by the engagement of keys 46 with ribs 56 (FIG. 6), of the spool. In this condition, the camera is locked as previously described, with an offset extension arm 58 of movable locking member 18 extending through the top wall of housing 12 into adjacent but non-contacting relation with the lower surface of knob 38.

To open the camera, the lock release element 24 is slid upwardly against the resistance of spring 28, thereby sliding member 18 out of engagement with member 16. As member 18 moves upwardly, the extension arm 58 thereof engages the lower surface of knob 38 and raises the knob to the position shown in FIGS. 3 and 4 to withdraw the spool driving member 42 from *direct* engagement with spool 30. After the movable locking member has been moved out of engagement with member 16, the lower horizontal portion of L-shaped slot 22 moves into alignment with rivet 20, thereby allowing member 18 to be rotated about element 24 to the position shown in FIG. 4 due to the offset position of spring 28. This movement of member 18 also serves to initiate the opening of cover 14 through the engagement of face 60 of locking member 16 with surface 62 of member 18. Having assumed this position, member 18 cannot return to the locking position shown in FIGS. 1 and 2 until the lower end thereof is moved into alignment with the vertical portion of slot 22 against the influence of spring 28. Thus, the spool driving member remains in its retracted position to assure easy loading and unloading of the camera *with a removable film magazine*.

As the cover is closed, face 60 of locking member 16 engages surface 62 of member 18 and displaces the lower end of the movable locking member to move the vertical portion of slot 22 into alignment with rivet 20, in which position member 18 is moved downwardly into locking engagement with member 16 by spring 28. As member 18 returns to the locking position, extension arm 58 is moved out of engagement with knob 38 to allow the spool driving member to be engaged with the film spool under the influence of spring 28 as shown in FIG. 2. If a rib 56 of the spool should happen to be exactly aligned with one of the spool engaging keys 46, the spool driving member will assume the position shown in FIG. 5, but will return to the position shown in FIG. 1 as soon as the knob is rotated by a sufficient amount to move the key out of supported relation atop the rib.

Figure 7:
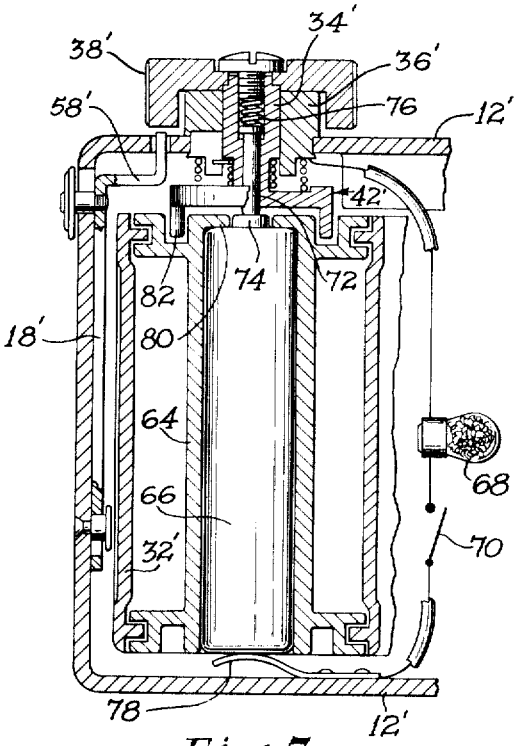
FIG. 7 is a partial cross sectional front view of a portion of a camera according to an alternate embodiment in which the take-up spool in a film magazine serves as a housing for a battery.
Figure 6:
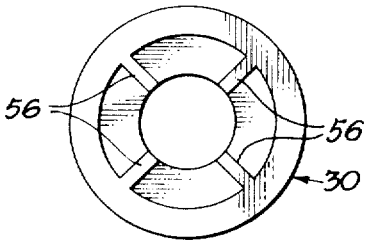
FIG. 6 is an end view of the film take-up spool shown in cross section in FIGS. 1, 3 and 5.
Figure 8:
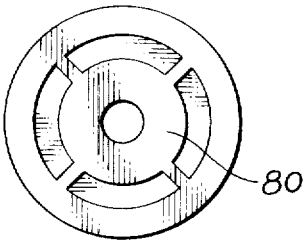
FIG. 8 is an end view of the film spool shown in FIG. 7.

FIG. 7 shows a similar embodiment of the invention which functions in the same manner described above, the corresponding elements being designated by primed numerals. The structural differences in this embodiment are dictated by the use of a film spool 64 similar to spool 30 but adapted to house a battery 66 to supply a source of power for a flash unit as shown schematically by flashlamp 68 and synchronizer switch 70 which is normally built into the shutter. In order to incorporate battery 66 in the circuit, shaft 34' is provided with a contact pin 72 which is urged into contact with battery terminal 74 by a light spring 76, to establish a circuit through the members of the film winding mechanism. To complete the circuit, the lower end of the battery is engaged by a resilient contact member 78 mounted on the camera housing. In the circuit as shown, shaft 34' and bushing 36' as well as contact pin 72 are assumed to be metal and thus conductive, while the camera housing 12' is formed of plastic or some other insulating material so that contact 78 may be mounted directly thereon without creating a short circuit. To insure the proper orientation of the battery in the spool, the upper end of the spool is provided with an annular lip 80 (FIGS. 7 and 8) surrounding battery terminal 74. If the battery is reversed in the spool, terminal 74 projects beyond the lower end thereof and is engaged by the resilient contact member to prevent insertion of the spool into the camera. As is evident from the drawings, such a spool construction dictates the employment of a driving member 42' having spool engaging pins 82 rather than keys of the type illustrated at 46.

Although the foregoing description relates to cameras having external winding knobs, the invention also encompasses cameras in which the film is wound by other means, for example, by means of a lever wind mechanism, a clockwork mechanism, an electric film advance mechanism, etc. [Likewise, the invention may be employed to disengage the rewind mechanism from the film supply spool in cameras in which the film is rewound after being exposed.] Since these and other modifications are within the spirit of the invention, the present disclosure is to be considered as illustrative only and not as limiting the scope of the invention which is defined by the following claims.

We claim:

1. In a camera [adapted to accommodate a rotatable film winding member, and having] *the combination comprising:*

(a) a housing *having means to accommodate within the housing a removable light sealed roll film magazine containing a rotatable film take-up spool,*

(b) a cover movable into [and out of] *a* closed position closing said housing *and out of the closed position to radially load and unload said magazine directly into and from said housing accommodating means while the cover is out of the closed position,*

(c) locking means movable between (1) a first position locking said cover in said closed position, and (2) a second position releasing said cover for movement out of said closed position, [and]

[(d) release means for moving said locking means from said first position to said second position,]

[the improvement comprising:]

[e] *(d)* winding mechanism *on said housing* remote from said release means, and including a driving member *on said housing* movable *axially* into and out of *direct* driving engagement with said [winding member] *spool* when said [winding member] *magazine* is accommodated in [the camera, and] *said housing,*

[f] *(e)* means for moving said driving member out of driving engagement with said [winding member] *spool* in response to movement of said locking means to said second position[.]

*and*

*(f) means for moving said driving member into direct driving engagement with said spool only in response to movement of said cover into the closed position.*

2. In a camera [adapted to accommodate a rotatable film winding member, and having] the *combination comprising:*

(a) a housing *having means to accommodate within the housing a removable light sealed roll film magazine containing a rotatable film take-up spool,*

(b) a cover movable into [and out of] a closed position closing said housing *and out of the closed position to radially load and unload said magazine directly into and from said housing accommodating means while the cover is out of the closed position,*

(c) locking means movable between (1) a first position in which said cover is locked in said closed position thereby, and (2) a second position in which said cover is released for movement out of said closed position, [and]

(d) a driving member *on said housing* movable *axially* into and out of *direct* engagement with said [rotatable winding member] *spool* when said [member] *magazine* is accommodated in said [camera] *housing* and adapted to impart rotational movement [thereto] *to the spool* when engaged therewith,

[the improvement comprising:]

(e) means for moving said driving member out of *direct* engagement with said [winding member]

*spool* as said locking means is moved from said first position to said second position, (f) latching means for releasably retaining said locking means in said second position, thereby retaining said driving member out of engagement with said [winding member] *spool*, and (g) means *responsive to movement of said cover into the closed portion* for releasing said latching means to free said locking means for movement from said second position to said first position *and to move said driving member into direct driving engagement with said spool.*

3. In a camera [adapted to accommodate a rotatable film winding member, and having] *the combination comprising:*

(a) a housing *having means to accommodate within the housing a removable light sealed roll film magazine containing a rotatable film take-up spool,*

(b) a cover movable into [and out of] a closed position closing said housing *and out of the closed position to radially load and unload said magazine directly into and from said housing accommodating means while the cover is out of the closed position,*

(c) locking means movable between (1) a first position in which said cover is locked in said closed position thereby, and (2) a second position in which said cover is released for movement out of said closed position, (d) resilient means urging said locking means toward said first position;

(e) means accessible to the camera operator for moving said locking means to said second position against the influence of said resilient means, [and]

(f) a driving member *on said housing* movable *axially* into and out of *direct* engagement with said [rotatable winding member] *spool* when said [member] *magazine* is accommodated in said camera and adapted to impart rotational movement to said [member] *spool* when engaged therewith,

[the improvement comprising:]

(g) means for moving said driving member out of *direct* engagement with said [winding member] *spool* in response to movement of said locking means from said first position to said second position, (h) latching means for releasably retaining said locking means in said second position, thereby retaining said driving member out of *direct* engagement with said [winding member] *spool,*

(i) means for releasing said latching means in response to the movement of said cover to said closed position, and (j) means for moving said driving member into direct engagement with said spool *only* in response to the movement of said locking means from said second position to said first position.

4. A camera according to claim 3 including means for initiating the movement of said cover from said closed position to said open position in response to the movement of said locking means to said second position.

5. In a photographic camera [adapted to accommodate a rotatable film winding member, and having] *the combination comprising:*

(a) a housing *having means to accommodate within the housing a removable light sealed roll film magazine containing a rotatable film take-up spool,*

(b) a cover movable into [and out of] a closed position with respect to said housing *and out of the closed position to radially load and unload said magazine directly into and from said housing accommodating means while the cover is out of the closed position,*

(c) locking means located at one end of said camera, said locking means being movable in a plane parallel to and spaced from the axis of rotation of [said winding member] *the spool of a loaded magazine,* between (1) a first position locking said cover in said closed position and (2) a second position in which said cover is released for movement out of said closed position, [and]

(d) a driving member *on said housing* axially engageable with said [winding member] *spool* and movable *axially* into and out of *direct* driving engagement therewith, for imparting rotational movement to said [winding member] *spool* when in driving engagement therewith,

[the improvement comprising:]

(e) means associated with said locking means for moving said driving member out of *direct* engagement with said [winding member] *spool* in response to the movement of said locking means from said first position to said second position, (f) latching means for releasably retaining said locking means in said second position, to retain said driving member out of *direct* engagement with said [winding member] *spool,* and (g) means for releasing said latching means to free said locking means for movement from said second position to said first position [.], *and*

(*h*) *means for moving said driving member into direct driving engagement with said spool only in response to movement of said cover into the closed position.*

6. A construction according to claim 5 in which said locking means comprises:

(a) a locking member slidably supported on said housing by (1) an externally accessible release element at one end of said locking member extending through a straight slot in said housing and (2) a post secured to said housing and extending into an L shaped slot at the other end of said locking member. said post being in the vertical leg of said L shaped slot when the locking member is in said first position, said post being aligned with the horizontal leg of the L shaped slot when the locking member is in said second position;

(b) resilient means urging said locking member toward said first position and tending to rotate said locking member about said release element whereby the horizontal portion of said L shaped slot moves into engagement with said post when the locking member is in said second position, and (c) latch release means associated with said cover for moving said locking member to align the vertical leg of said L shaped slot with said post when the said cover is closed.

7. In a photographic camera [adapted to accommodate a rotatable film winding member, and having] *the combination comprising*:

(a) a box-like housing *having means to accommodate within the housing a removable light sealed roll film magazine containing a rotatable film take-up spool,*

(b) a box-like cover member hinged at one end to the adjacent end portion of said housing for movement into and out of a closed position closing said housing,

[the improvement comprising:]

(c) cover locking means comprising:

(1) a stationary latch member on the free end of said cover member, (2) a movable latch member on the free end of said housing movable between (a) a first position in which said stationary latch member is engaged thereby to lock said cover in closed position and (b) a second position out of locking engagement with said stationary latch member to release said cover for movement out of said closed position, (3) externally accessible latch release means for moving said movable latch member to said second position, (4) resilient means biasing said movable latch member toward said first position, (5) detent means for releasably retaining said movable latch in said second position, (6) detent release means to free said movable latch member for movement from said second position to said first position upon the actuation thereof and (7) cooperating means on said cover and said housing for actuating said detent release means in response to the movement of said cover to said closed position, (d) means *while the cover is out of the closed position* for *radially* receiving a *magazine within said housing with the* rotatable film [winding member] *take-up spool* [within said housing] in parallel relation to the free end thereof, (e) a driving member *on the housing axially* movable into and out of *direct* engagement with [a] *the* [film winding member] *spool* [so] *of the* received *magazine* for imparting rotational movement to said [winding member] *spool* when engaged therewith, said driving member comprising:

(1) spindle provided with [winding member] *spool* engaging means at one end thereof, (2) means mounted on said housing for supporting said spindle for axial movement into and out of an operative position in which [a winding member] *the spool of a magazine* received in said housing is engaged by said [winding member] *direct spool* engaging means, and for rotational movement for driving a [winding member] *spool* engaged by said [winding member driving] *direct spool engaging* means, (3) means for imparting rotational movement to said spindle, (f) means operatively connecting said spindle and said movable latch member for moving said spindle out of said operative position when said movable latch member is moved to said second position, (g) means for moving said spindle into said operative position [when] *only in response to movement of* said movable latch [means is moved] *member* to said first position.

References Cited by the Examiner

The following references, cited by the Examiner, are of record in the patented file of this patent or the original patent:

UNITED STATES PATENTS

| | | | |
|---|---|---|---|
| 1,303,918 | 5/1919 | Kroedel | 95—32 |
| 1,527,476 | 2/1925 | Gianetto | 95—31 |
| 1,792,436 | 2/1931 | Mery | 88—17 |
| 2,218,966 | 10/1940 | Zapp | 95—31 X |
| 2,391,497 | 12/1945 | Wilson et al. | 88—17 |
| 2,476,996 | 7/1949 | Nebel | 242—71.1 |
| 2,581,691 | 1/1952 | Moomaw et al. | 242—71 |
| 2,721,041 | 10/1955 | Nerwin | 242—71.1 |
| 2,983,462 | 5/1961 | Berlings | 242—71.2 |

FOREIGN PATENTS

| | | |
|---|---|---|
| 681 | 1908 | Great Britain. |
| 583,515 | 9/1933 | Germany. |

NORTON ANSHER, *Primary Examiner.*

EVON C. BLUNK, *Examiner.*

V. A. SMITH, *Assistant Examiner.*